(12) United States Patent
Campo

(10) Patent No.: US 8,886,409 B2
(45) Date of Patent: Nov. 11, 2014

(54) CHECKING METHOD IMPLEMENTED BY A STEERING SYSTEM REGULATING FUNCTION

(75) Inventor: Marc Campo, Chatillon (FR)

(73) Assignee: Peugeot Citroën Automobiles SA, Route de Gisy, Velizy Villacoublay (FR)

( * ) Notice: Subject to any disclaimer, the term of this patent is extended or adjusted under 35 U.S.C. 154(b) by 0 days.

(21) Appl. No.: 13/823,384

(22) PCT Filed: Dec. 6, 2011

(86) PCT No.: PCT/FR2011/052880
§ 371 (c)(1),
(2), (4) Date: Apr. 19, 2013

(87) PCT Pub. No.: WO2012/076805
PCT Pub. Date: Jun. 14, 2012

(65) Prior Publication Data
US 2013/0304324 A1 Nov. 14, 2013

(30) Foreign Application Priority Data

Dec. 10, 2010 (FR) ..................... 10 60382

(51) Int. Cl.
*B62D 6/00* (2006.01)
*B62D 15/02* (2006.01)

(52) U.S. Cl.
CPC .............. *B62D 6/001* (2013.01); *B62D 15/025* (2013.01)
USPC ............................................ 701/41; 701/42

(58) Field of Classification Search
CPC .......... B62D 5/04; B62D 6/00; B62D 5/0409; B62D 5/046; B62D 6/002; B62D 6/02; B62D 6/04; B62D 6/10; A01B 69/00

USPC .................. 701/41–44, 36; 180/441–446
See application file for complete search history.

(56) References Cited

U.S. PATENT DOCUMENTS

| 6,102,151 A | * | 8/2000 | Shimizu et al. | ............... 180/446 |
| 6,278,922 B1 | | 8/2001 | Nishiwaki | |
| 6,374,167 B2 | * | 4/2002 | Iwazaki | ............ 701/41 |
| 8,700,263 B2 | * | 4/2014 | Matthews | ........ 701/42 |
| 2002/0016657 A1 | | 2/2002 | Iwazaki | |

FOREIGN PATENT DOCUMENTS

| DE | 102008000941 A1 | 10/2009 |
| EP | 1346901 A2 | 9/2003 |
| EP | 1864889 A2 | 12/2007 |

OTHER PUBLICATIONS

International Search Report from corresponding International Patent Application No. PCT/FR2011/052880, mailed Aug. 2, 2012.

\* cited by examiner

*Primary Examiner* — Richard Camby
(74) *Attorney, Agent, or Firm* — Polster, Lieder, Woodruff & Lucchesi, L.C.

(57) ABSTRACT

Checking method implemented by a function that automatically checks a steering system (1) of a motor vehicle comprising a steering wheel (4) to operate a powered system (20) that turns the wheels (10) under certain specific conditions of operation of this vehicle, this checking method calculating a reference steering wheel angle (Av cons) to provide torque control of the power system (20), characterized in that it additionally calculates a steering wheel rate of turn reference (Av cons) which is saturated at a predefined value (Avp target).

6 Claims, 1 Drawing Sheet

CHECKING METHOD IMPLEMENTED BY A STEERING SYSTEM REGULATING FUNCTION

CROSS-REFERENCE TO RELATED APPLICATIONS

The present application is the US national stage under 35 U.S.C. §371 of International Application No. PCT/FR2011/052880 having an international filing date of Dec. 6, 2011, which claims the priority of French application 1060382 filed on Dec. 10, 2010.

BACKGROUND

This invention involves a control process of an automatic control function of a steering system for an automotive vehicle, as well as a steering system and an automotive vehicle comprising such a control process.

Generally, automotive vehicles comprise a steering wheel secured to a steering system column which is operated by the driver to turn the front wheels of this vehicle.

Usually, steering systems comprise a booster device that generates a portion of the energy required to turn the wheels, so as to reduce the effort that the driver must deliver, in particular at low speed and standstill maneuvers.

In addition, certain steering systems comprise a motorization unit, automatically controlled by a control computer, that may act on the steering column and control the turning of the front wheels to perform certain specific functions, such as for low speed City Park maneuvers, or safety maneuvers such as avoiding an obstacle, or a return to the normal traffic lane in case of detecting an exit or a risk of exiting this lane ("PFIL", "LKS", "LKAS").

The motorization unit for the control function may include in particular an electric motor or hydraulic cylinders of the booster device, to generate the effort that involves the rotation of the steering column and the corresponding turning of the wheels. The control computer that receives the sensor information, such as from a steering wheel angle sensor, implements a control process of this motorization unit, to produce a position control of the steering column required by the control function.

A known control process measures the angle difference between the actual position of the steering column and a theoretic position to calculate through a PID or RST type regulation system, for instance, the torque set point that the motorization unit must deliver to arrive at the angular position of the steering column that it has foreseen.

However, the driver may want to take over control again by applying, among others, an opposite force on the steering wheel, if he wants for instance to steer the vehicle himself by imposing a direction different from the one that the automatic steering control function seeks to achieve.

In this case, when the effort applied on the steering is opposed to the torque generated by the motorization unit, the angular difference between the real position of the steering column and the position requested by the function increases, and the position servo-control tends to generate a greater torque to arrive even better in achieving the calculated position.

Then, if the driver suddenly releases the steering wheel, one obtains a recall torque of this steering wheel generated by the motorization unit that is even greater than the angular difference. The steering wheel starts at a high speed, within the dynamics range given by the servo control system and the motorization unit, which is unpleasant, and can be annoying or even dangerous.

SUMMARY

The purpose of this invention is among other to avoid these inconveniences of the prior art, and to bring a simple and efficient solution to reduce the discontinuity between an automatic regulation or control of turning the front wheels, and an intervention by the driver who thwarts it.

For that purpose, a control process is disclosed which is implemented by an automatic control function of a steering system of an automotive vehicle comprising a steering wheel, to run a motorization unit that performs the turning of the wheels in certain specific operating conditions of this vehicle, with this control process computing a set point steering wheel angle to achieve a torque servo control of the motorization unit, characterized in that the control process also calculates a steering wheel rotating speed set point which is saturated at a predefined value.

An advantage of this control process is that in case of intervention by the driver on the steering wheel that thwarts the motorization unit action, bringing about a growing difference between the steering wheel angle set point and the actual position of this steering wheel, and if the driver suddenly releases the steering wheel, the steering wheel restarts with a regulated speed which is limited to the predefined value to smoothly achieve a linkage which brings back the actual position to the set point position, irrespective of the difference between these two values.

In addition, the control process can include one or more of the following features, which can be combined with each other.

Beneficially, the predefined saturation value is calculated to ensure comfort in case of the sudden release of the steering wheel after an intervention by the driver on this steering wheel, during the operation of the automatic control function, irrespective the difference generated by the driver.

In particular, the control process can perform the following operations:
First of all, it establishes a steering wheel angle set point which enables the steering system to achieve its position target, which is compared with the steering wheel angle measured by a steering system sensor, to calculate the steering wheel speed set point; and
This steering wheel speed set point is then compared with the measured steering wheel speed to regulate the actual speed of the steering wheel by calculating an additional torque requested from the motorization unit of the steering box which corrects this measured actual speed.

Beneficially, the control process implements a proportional/derived type regulation system to calculate the transfer function of the regulation that provides the additional torque.

The control process can calculate the transfer function of the regulation as follows, with P and D being constant:

$$T_{reg} = P(Av_{set} - Av_{mes}) + D(Avp_{set} - AvP_{mes})$$

and calculate the predefined saturation value of the target as follows:

$$Avp_{target} = P/D(Av_{set} - Av_{mes}) + Avp_{set}.$$

It is also the purpose of the invention to provide a steering system for an automotive vehicle, comprising an automatic control function of this steering which is implemented by a control process that comprises any of the preceding features.

In addition, the purpose of the invention is an automotive vehicle with a steering system comprising an automatic control function of this steering which is implemented by a control process that comprises any of the preceding features.

BRIEF DESCRIPTION OF THE FIGURES

The invention will be better understood and other features and benefits will appear more clearly when reading the description below provided as an example and not limited in nature, while making reference to the attached drawings in which.

DETAILED DESCRIPTION

Figure 1:
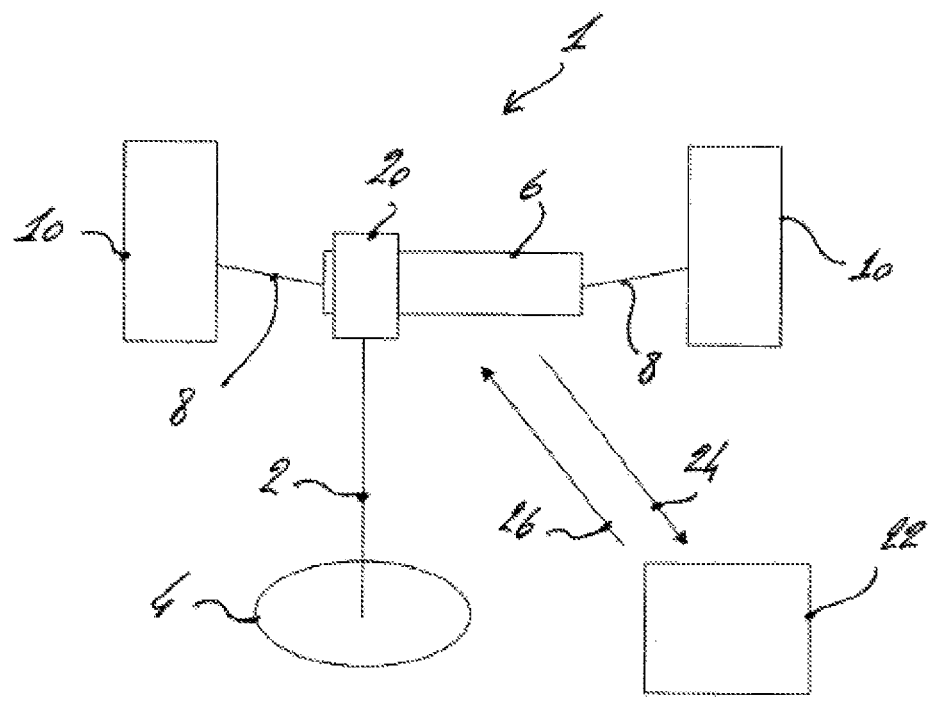
FIG. 1 is a diagram of a steering system that comprises the control process according to the invention.

FIG. 1 shows an active steering system 1 comprising a steering column 2 linking a steering wheel 4 secured at its top end to a steering box 6 secured to its bottom end.

Steering box 6 includes a movement transformation mechanism, such as a rack, which with a rotation of steering wheel 4, that applies a transverse movement to two small tie rods 8 located at its ends. The small tie rods 8 turn the front wheels 10, by pivoting the hubs of these wheels around a substantially vertical axis.

Steering box 6 includes a motorization unit 20 which can use either electric or hydraulic power, to apply a force on the mechanism of this box driving the rotation of steering wheel 4 as well as the corresponding turning of wheels 10.

In particular, motorization unit 20 can be the motorization unit used by a conventional steering booster of the vehicle, which delivers an additional part of the turning force, from a manoeuver performed by the driver on steering wheel 4.

Steering system 1 also includes automatic control functions governed by a control computer 22, which by using motorization unit 20 permits automatically performing maneuvers or operations with this steering.

When an automatic control function is activated, the control computer 22 receives data 24 from steering system 1, in particular about the angular position of steering wheel 4 delivered by a sensor, as well as other data about the operation of the vehicle, such as its speed for instance, to perform on the other hand a servo control 26 of motorization unit 20 and obtain the desired turning of wheels 10.

Figure 2:
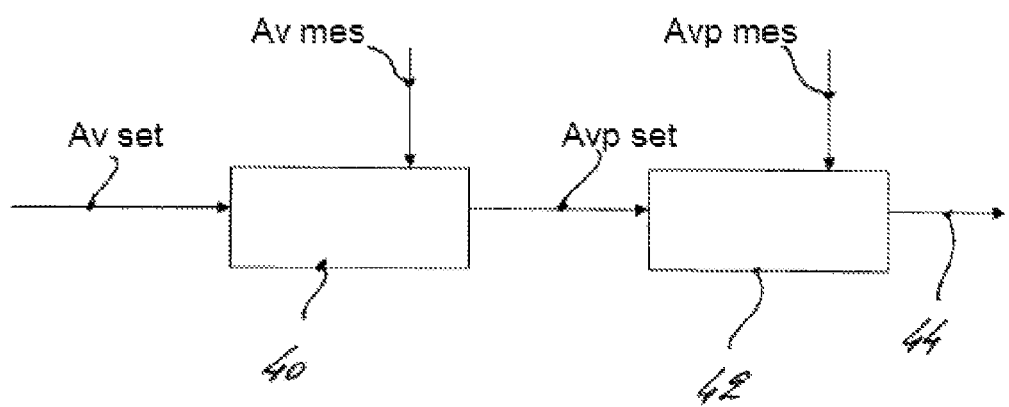
FIG. 2 is a functional graph of the various stages of the control process.

FIG. 2 shows a control process of steering system 1 for an automatic control function of the steering, implemented by control computer 22 which performs the following steps.

The control process first establishes a steering wheel angle set point $Av_{set}$ which permits steering system 1 to achieve its position objective. The steering wheel angle set point $Av_{set}$ is then compared with the steering wheel angle $Av_{mes}$ which is measured by the sensor of steering system 1 to calculate 40 the steering wheel speed set point $Avp_{set}$.

The steering wheel speed set point $Avp_{set}$ is then compared with the measured steering wheel speed $Avp_{mes}$, established for instance by deriving with respect to time the measured steering wheel angle $Av_{mes}$, to be able to regulate the actual speed of steering wheel 4 by calculating 42 an additional torque 44 requested from motorization unit 20 of steering box 6. Additional torque 44 provides on the basis of the inertias and of the different forces that are applied to the steering, an acceleration of the steering wheel angle to correct the actual measured speed $Avp_{mes}$, in order to obtain a servo control of the actual speed with respect to the speed set point $Avp_{set}$.

In practice, the control process performs the following operations to perform the steps shown above, with a proportional/derived (PID) type regulation system to calculate the regulation transfer function. The steering wheel angle Av being measured counter-clockwise, and the steering wheel speed Avp being positive counter-clockwise, the following values are defined:

$Av_{mes}$=measured steering wheel angle
$Av_{set}$=steering wheel angle set point
$Avp_{mes}$=measured steering wheel speed (derived from the measured steering wheel angle)
$Avp_{set}$=steering wheel speed set point
$Avp_{target}$=steering wheel speed saturation The angular error of the steering wheel $\Delta$ Av position is as follows:

$$\Delta Av = Av_{set} - Av_{mes}$$

The $T_{reg}$ transfer function giving the regulation torque can then be written as follows, with P and D being constant:

$$T_{reg} = P(Av_{set} - Av_{mes}) + D(Avp_{set} - Avp_{mes})$$

A target for the steering wheel speed set point $Avp_{target}$ can be determined as follows:

$$T_{reg} = D(Avp_{target} - Avp_{mes})$$

Then one obtains:

$$D(Avp_{target} - Avp_{mes}) = P(Av_{set} - Av_{mes}) + D(Avp_{set} - Avp_{mes})$$

Which can also be written as:

$$Avp_{target} = P/D \, (Av_{set} - Av_{mes}) + Avp_{set}$$

The one saturates the steering wheel target speed $Avp_{target}$ to an acceptable value, providing the driver with a maximum steering wheel speed which provides at the same time comfort and safety, to connect the position of the steering wheel when suddenly released by the driver, with the set point position.

Consequently with this type of position connection, one can ensure a certain acceptable continuity of the function, without removing it completely during a manual operation. Then, the function is quick to resume its normal course of operation, once the driver's intervention has come to an end.

The invention claimed is:

1. A control process implemented by an automatic control function of a steering system of an automotive vehicle comprising a steering wheel; the control process controlling a motorization unit which turns the wheels under certain specific conditions of operation of the vehicle; the control process calculating a steering wheel angle set point ($Av_{set}$) to perform a torque servo control of the motorization unit; the control process also calculating a set point for the steering wheel rotation seed ($Avp_{set}$) which is saturated at a predefined value ($Avp_{target}$);

wherein the predefined saturation value of the steering wheel rotation speed ($Avp_{target}$) is calculated to ensure comfort in case of a sudden release of the steering wheel after an intervention by the driver on this the steering wheel during the operation of the automatic control function, irrespective of the difference generated by the driver.

2. The control process according to claim 1, wherein the control process performs the following operations:

first it establishes a steering wheel angle set point ($Av_{set}$) which enables the automatic control function of the steering system to achieve its position objective, compares the steering wheel angle set point ($Av_{set}$) with the steering wheel angle ($Av_{mes}$) measured by a sensor of the steering system, to calculate the steering wheel speed set point ($Avp_{set}$);

and the steering wheel speed set point ($Avp_{set}$) is then compared with the measured steering wheel speed ($Avp_{mes}$)

to regulate the actual speed of the steering wheel by calculating an additional torque requested from the motorization unit of the steering box which corrects the measured actual steering wheel speed ($Avp_{mes}$).

3. The control process according to claim 1, wherein the control process implements a proportional/derived (PID) type regulation system to calculate the regulation transfer function($T_{reg}$) providing the additional torque.

4. The control process according to claim 3, wherein the control process calculates the regulation transfer function ($T_{reg}$) as follows, with P and D being constant:

$$T_{reg}=P(Av_{set}-Av_{mes})+D(Avp_{set}-Avp_{mes});$$

and calculates the predefined saturation value of the target as follows:

$$Avp_{target}=P/D(Av_{set}-Av_{mes})+Avp_{set}.$$

5. A steering system for an automotive vehicle comprising an automatic control function for the steering system; wherein the automatic control function is implemented by a control process performed according to claim 1.

6. An automotive vehicle comprising asteering system comprising an automatic control function for the steering system; wherein the automatic control function is implemented by a control process performed according to claim 1.

* * * * *